(12) United States Patent
Inoue

(10) Patent No.: US 8,317,171 B2
(45) Date of Patent: Nov. 27, 2012

(54) BICYCLE SUSPENSION HAVING STROKE AND DAMPER ADJUSTMENT

(75) Inventor: Jun Inoue, Osaka (JP)

(73) Assignee: Shimano Inc., Sakai (JP)

( * ) Notice: Subject to any disclaimer, the term of this patent is extended or adjusted under 35 U.S.C. 154(b) by 709 days.

(21) Appl. No.: 12/101,600

(22) Filed: Apr. 11, 2008

(65) Prior Publication Data

US 2009/0255768 A1 Oct. 15, 2009

(51) Int. Cl.
*B60G 13/00* (2006.01)
*B62K 1/00* (2006.01)

(52) U.S. Cl. ............... 267/218; 280/276; 188/299.1

(58) Field of Classification Search .......... 280/276; 267/195, 64.15, 64.16, 217, 218; 188/297, 188/299.1, 310, 106 P
See application file for complete search history.

(56) References Cited

U.S. PATENT DOCUMENTS

| | | | |
|---|---|---|---|
| 6,026,939 A | 2/2000 | Girvin et al. | |
| 6,105,988 A * | 8/2000 | Turner et al. | 280/276 |
| 6,217,049 B1 * | 4/2001 | Becker | 280/276 |
| 6,767,024 B1 | 7/2004 | Kuo | |
| 6,786,498 B1 | 9/2004 | Chang | |
| 7,163,222 B2 * | 1/2007 | Becker et al. | 280/276 |
| 7,357,232 B2 * | 4/2008 | Fujita | 188/297 |
| 7,806,022 B2 * | 10/2010 | Hara | 74/502.2 |
| 2003/0071400 A1 * | 4/2003 | Graves et al. | 267/140.11 |
| 2005/0103149 A1 | 5/2005 | Hunt et al. | |
| 2005/0194197 A1 * | 9/2005 | Fukuda et al. | 180/227 |
| 2005/0252330 A1 | 11/2005 | Denk | |
| 2007/0007743 A1 * | 1/2007 | Becker et al. | 280/276 |
| 2008/0041681 A1 | 2/2008 | Shipman | |

FOREIGN PATENT DOCUMENTS

| | | |
|---|---|---|
| DE | 19532088 | 3/1997 |
| EP | 0994014 | 4/2000 |

OTHER PUBLICATIONS

Extended European Search Report for corresponding EP Application No. 08169316.0-2425, Dec. 27, 2010.

* cited by examiner

*Primary Examiner* — Bradley King
*Assistant Examiner* — Vishal Sahni
(74) *Attorney, Agent, or Firm* — Ditthavong Mori & Steiner, P.C.

(57) ABSTRACT

A bicycle suspension including a stroke adjustment unit, a suspension damper, and a damper adjustment unit. The stroke adjustment unit is configured to adjust a stroke of the bicycle suspension, which is configured to expand and contract within the stroke. The suspension damper is configured to apply damping force to the bicycle suspension, and the damper adjustment unit is configured to adjust the damping force applied by the suspension damper in accordance with the stroke adjusted by the stroke adjustment unit.

23 Claims, 9 Drawing Sheets

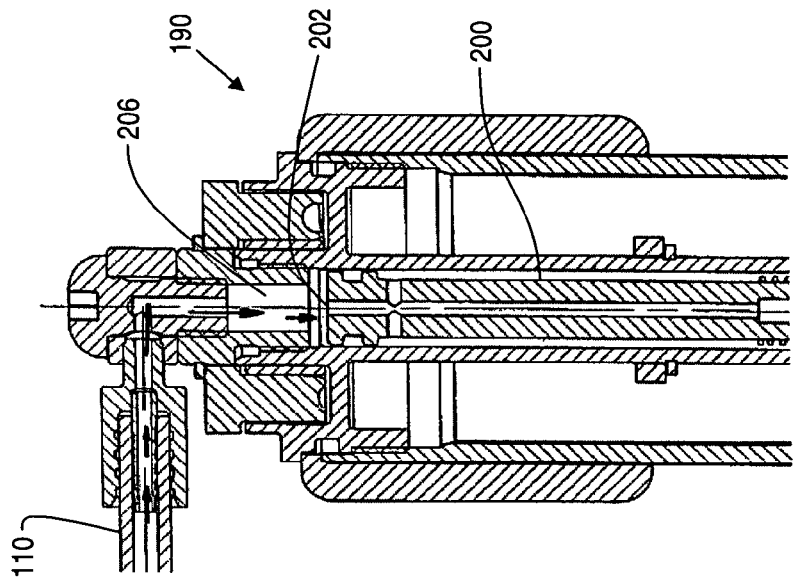
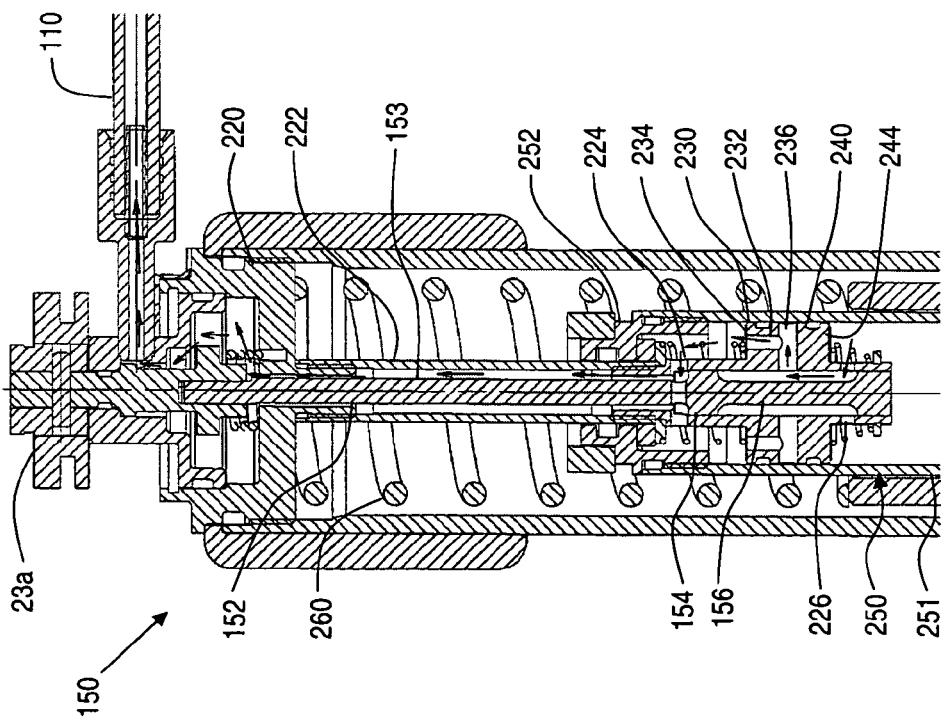
FIG. 5B
FIG. 5A

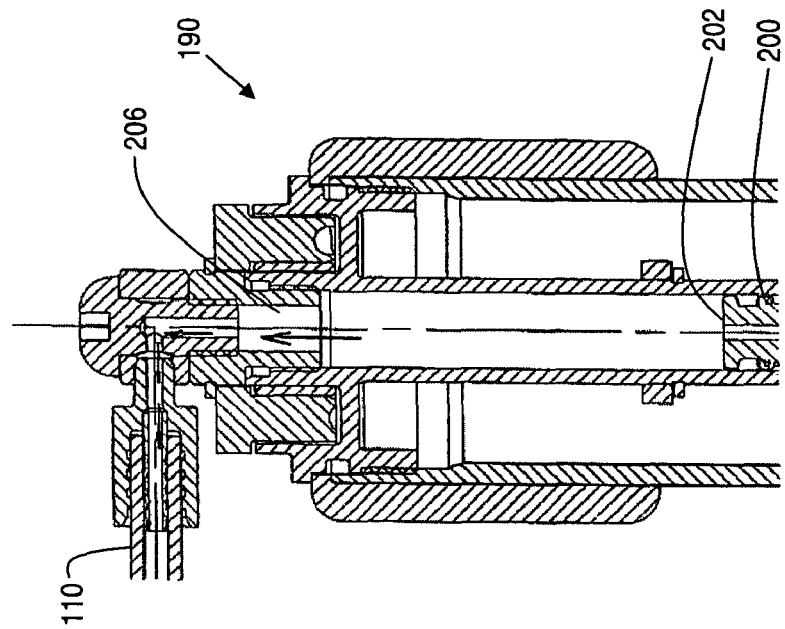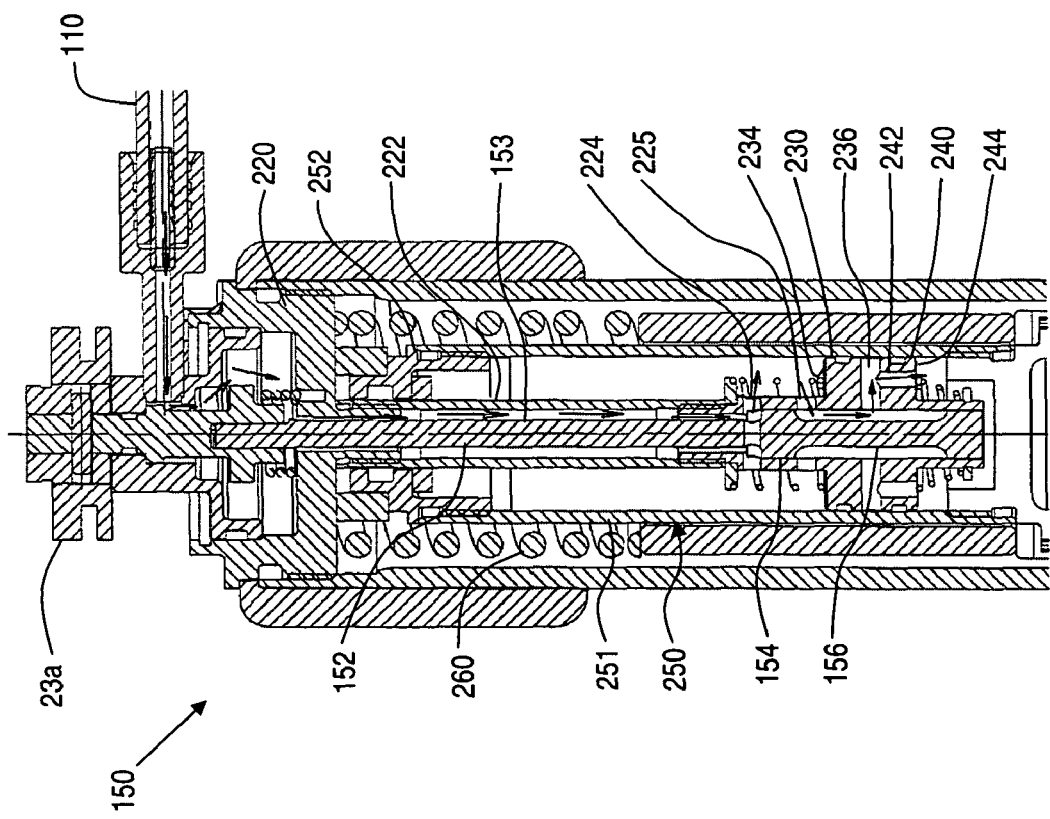
FIG. 6B
FIG. 6A

BICYCLE SUSPENSION HAVING STROKE AND DAMPER ADJUSTMENT

BACKGROUND OF THE INVENTION

1. Field of the Invention

The present invention relates to a suspension for a bicycle.

2. Discussion of the Background

Bicycling is becoming an increasingly more popular form of recreation as well as a means of transportation. Moreover, bicycling has become a very popular competitive sport for both amateurs and professionals. The bicycle industry is constantly improving the various components of the bicycle. In the past, most bicycles had rigid frames that were not provided with front or rear suspension. Thus, such rigid frames typically transmitted shocks resulting from rough riding surfaces directly to a rider.

More recently, bicycles, especially mountain bikes (MTB) and all terrain bikes (ATB), have been outfitted with front and/or rear suspension assemblies to absorb the shocks transmitted to the rider when riding on a rough road. In bicycles with suspensions, it is sometimes desirable to be able to quickly adjust or lockout the suspension as needed and/or desired. Thus, there have been proposals to provide a suspension actuating device on the handlebar of the bicycle so that the rider can adjust or lockout the suspension as needed and or desired while riding, as can be seen from a review of U.S. Pat. No. 6,767,024, U.S. Patent Publication No. 2005/0103149, and U.S. Patent Publication No. 2005/0252330.

It is desirable to continue to improve upon the structure and function of such bicycle components.

SUMMARY OF THE INVENTION

An aspect of the present invention advantageously provides a bicycle suspension including a stroke adjustment unit, a suspension damper, and a damper adjustment unit. The stroke adjustment unit is configured to adjust a stroke of the bicycle suspension, which is configured to expand and contract within the stroke. The suspension damper is configured to apply damping force to the bicycle suspension, and the damper adjustment unit is configured to adjust the damping force applied by the suspension damper in accordance with the stroke adjusted by the stroke adjustment unit.

An additional aspect of the invention advantageously provides a bicycle suspension including means for adjusting a stroke of the bicycle suspension, which is configured to expand and contract within the stroke, means for applying a damping force to the bicycle suspension, and means for adjusting the damping force in accordance with the stroke adjusted by the means for adjusting the stroke.

A further aspect of the invention advantageously provides a method of adjusting a bicycle suspension having a suspension damper configured to apply damping force to the bicycle suspension, where the method includes adjusting a stroke of the bicycle suspension, which is configured to expand and contract within the stroke, and adjusting the damping force in accordance with the adjusting of the stroke.

These and other features, aspects, and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 5A and 5B are enlarged, partial front cross-sectional views of the shock absorber units of the front suspension of FIG. 3A in the long stroke position and the stroke adjustment actuator in the first position, and showing a flow of actuating fluid therein as the shock absorber units begin movement from the long stroke position to the short stroke position, in accordance with an exemplary embodiment of the present invention;

FIGS. 6A and 6B are enlarged, partial front cross-sectional views of the shock absorber units of the front suspension of FIG. 3A in the short stroke position and the stroke adjustment actuator in a second position, and showing a flow of actuating fluid therein as the shock absorber units begin movement from the short stroke position to the long stroke position, in accordance with an exemplary embodiment of the present invention;

DETAILED DESCRIPTION OF EMBODIMENTS OF THE INVENTION

Figure 1:
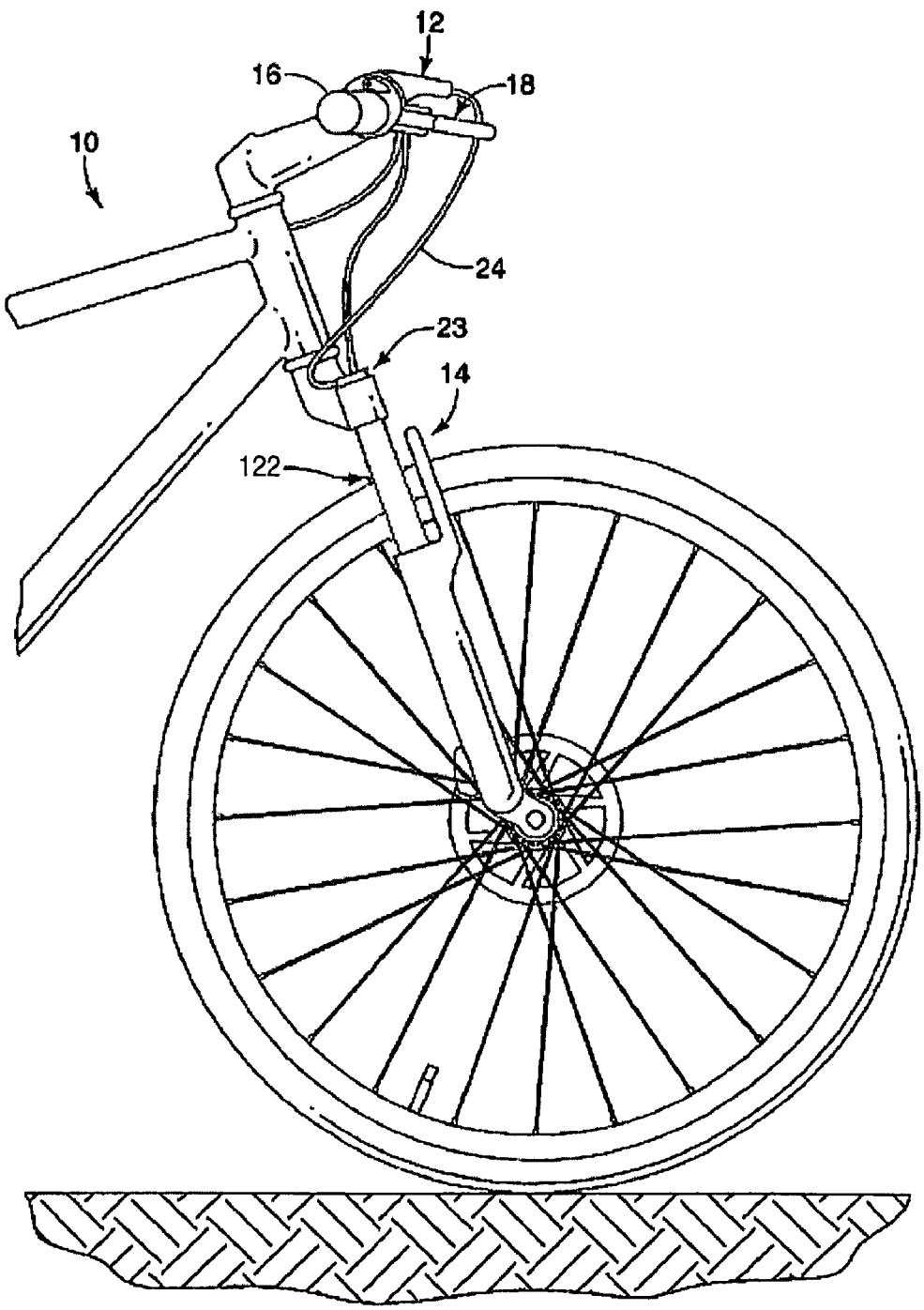
FIG. 1 is a partial side elevational view of a front portion of a bicycle with a suspension actuating unit, in accordance with an exemplary embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary. It will be apparent to those skilled in the art from this disclosure that the following descriptions of the embodiments of the present invention are provided for illustration only and not for the purpose of limiting the invention as defined by the appended claims and their equivalents.

Figure 2:
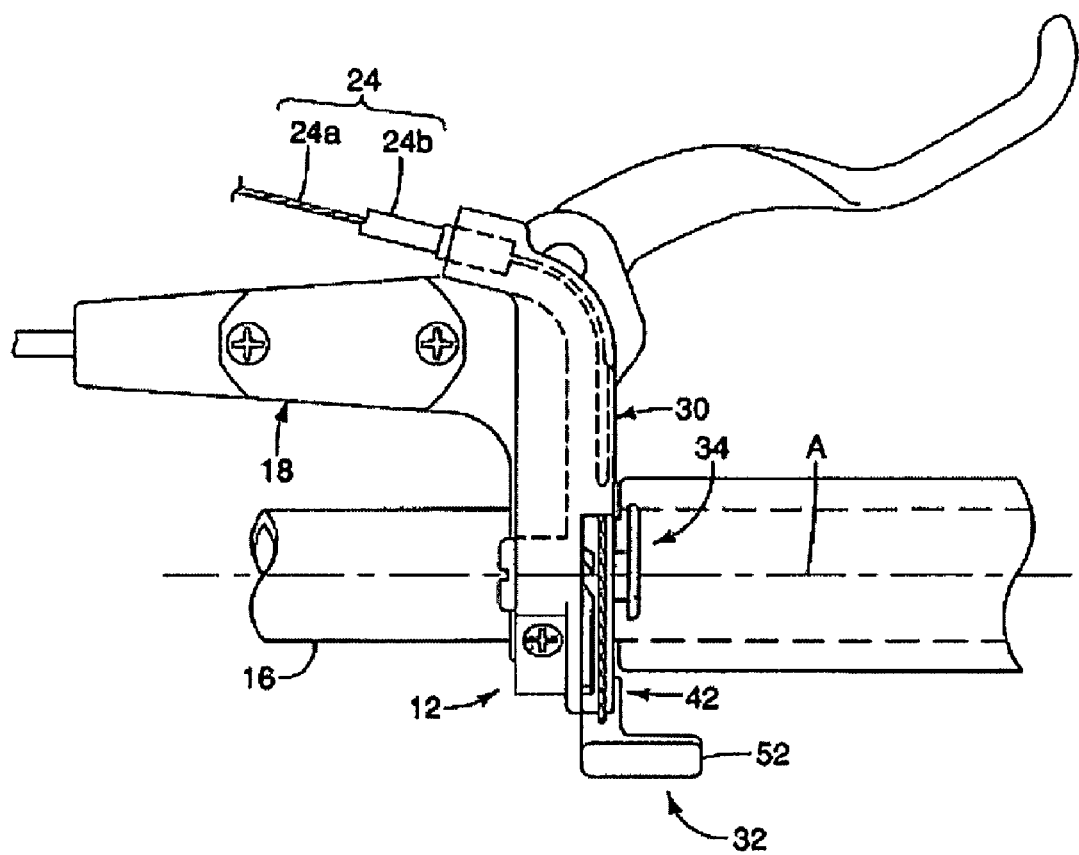
FIG. 2 is a top plan view of the suspension actuating unit mounted to a hydraulic brake lever, in accordance with an exemplary embodiment of the present invention.

Referring initially to FIGS. 1 and 2, a bicycle 10 is illustrated that is equipped with a bicycle component actuating device (or suspension actuating unit) 12 for selectively controlling a front suspension 14 in accordance with an embodiment of the present invention. In particular, the actuating unit 12 is operatively coupled to the front suspension 14 to selectively switch between a first operating position (e.g., a first suspension setting position) and a second operating position (e.g., a second suspension setting position). In the illustrated embodiment, the first operating position corresponds to a long-to-short stroke position, while the second operating position corresponds to a short-to-long stroke position, as will be described in greater detail below. This embodiment of the present invention also provides a suspension lockout feature when the front suspension 14 is in a position that provides the shortest stroke, such that the expansion and contraction of a first shock absorber unit (or first telescopic tube) 120 and a second shock absorber unit (or second telescopic tube) 160 of the front suspension 14 is selectively locked and unlocked, as will be discussed in greater detail below with respect to FIGS. 3A-6B, for example.

Figures 3A, 3B:
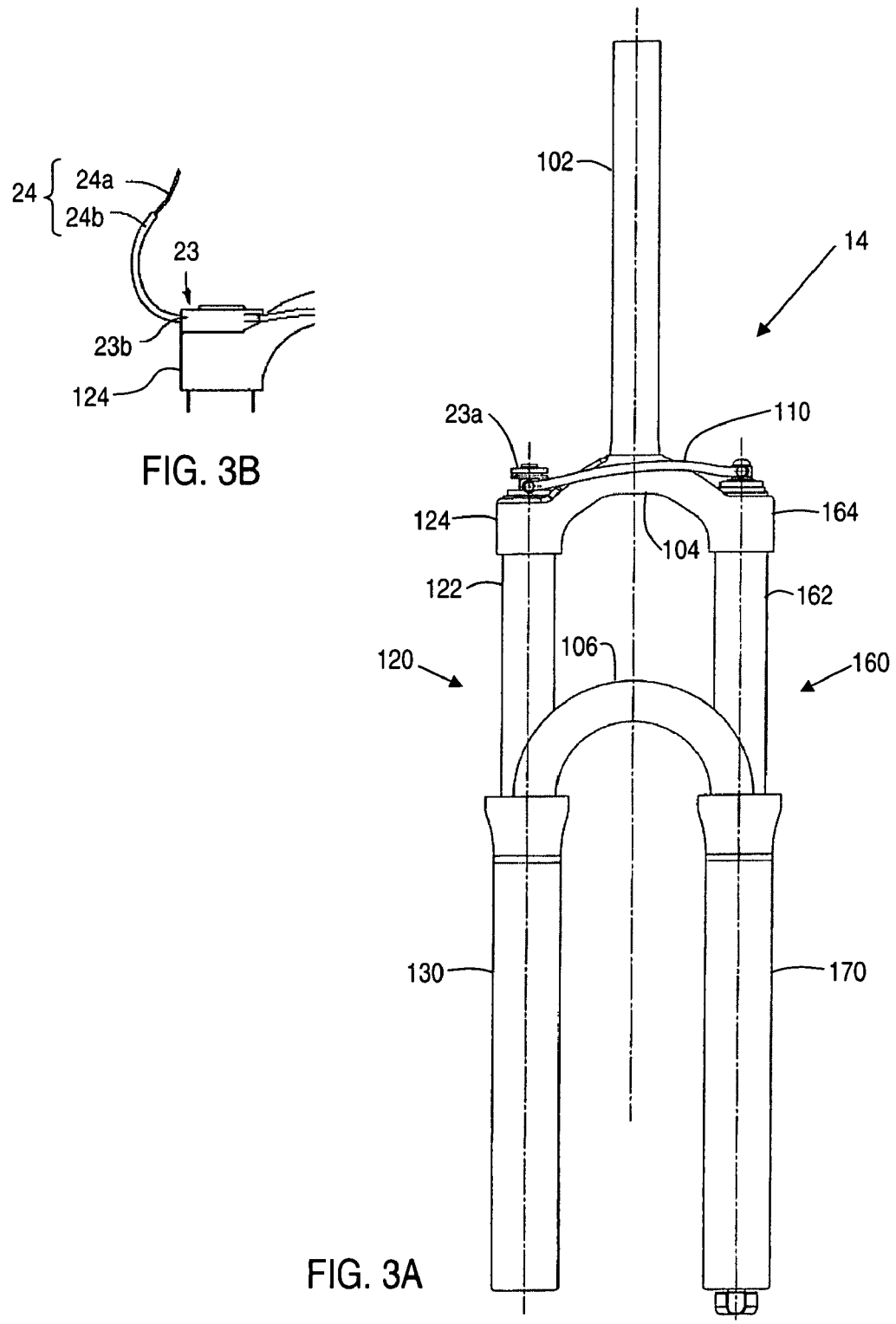
FIG. 3A is a front elevational view of a front suspension and stroke adjustment actuator that is operated by the suspension actuating unit, in accordance with an exemplary embodiment of the present invention.
FIG. 3B is an enlarged, partial front elevational view of the front suspension of FIG. 3A with a stroke adjustment actuator housing of the front suspension in place, in accordance with an exemplary embodiment of the present invention.

As seen in FIGS. 1 and 3A, the front suspension 14 has a first shock absorber unit 120 that includes an upper telescopic tube 122 slidably received within a lower portion 130, and a second shock absorber unit 160 that includes an upper telescopic tube 162 slidably received within a lower portion 170. The first and second shock absorber units 120 and 160 are configured to absorb and dampen shocks while riding the bicycle 10 over rough terrain. The upper telescopic tube 122 is provided with a suspension setting mechanism 23 for selectively setting the front suspension 14 to control expansion and contraction of the telescopic tubes 120 and 160. The suspension setting mechanism 23 is provided with a cable operated adjustment knob (or stroke adjustment actuator) 23a that can be moved (e.g., rotated) between at least two positions (e.g., the first operating position corresponding to the long-to-short stroke position, and the second operating position corresponding to the short-to-long stroke position) using the actuating unit 12.

As seen in FIGS. 1 and 2, the bicycle component actuating unit 12 is mounted to a handlebar 16 via a tube clamp of a brake lever 18; however, the actuating unit 12 can alternatively be mounted to the handlebar 16 via a separate tube clamp. In the illustrated embodiment, the actuating unit 12 is configured and arranged to operate the adjustment knob 23a by, for example, a control cable 24 that has an inner wire 24a and an outer casing 24b. The inner wire 24a can be pulled by the actuating unit 12 to switch the front suspension 14 from the first operating position to the second operating position, and the inner wire 24a can be released by the actuating unit 12 to switch the front suspension 14 from the second operating position to the first operating position. Thus, when the actuating unit 12 is operated to pull the inner wire 24a, then the adjustment knob 23a is rotated in one direction, and, when the actuating unit 12 is operated to release the inner wire 24a, the adjustment knob 23a is turned in the opposite direction.

Referring now to FIG. 2, the actuating unit 12 basically includes a base member 30, a wire winding mechanism 32 having a lever portion 52 and a release mechanism 34. The base member 30 is a stationary member that is fixedly mounted to an end portion of the handlebar 16 and is positioned so that the rider can easily operate the wire winding mechanism 32 and the release mechanism 34 without the rider's hand leaving the handlebar 16. Generally speaking, the wire winding mechanism 32 has an operating path that curves about a center mounting axis A of the handlebar 16, while the release mechanism 34 has an operating path of that extends linearly (e.g., parallel) with respect to the mounting axis A. The wire winding mechanism 32 basically includes a first user operating member 42 movably mounted relative to the base member 30 for rotation between the first operating position and the second operating position about a rotational axis.

The first user operating member 42 is biased relative to the base member 30 to the first operating position. Thus, the user can push the operating member 42 from the first operating position to the second operating position, where the operating member 42 becomes locked in position. If the user desires to return from the second operating position to the first operating position, then the user actuates the release mechanism 34 thereby unlocking the operating member 42, which is then automatically returned to the first operating position by the biasing force acting thereon.

Many different types of actuating units can alternatively be used in conjunction with the embodiments of the present invention, as will be readily apparent to those of ordinary skill in the art based upon the disclosure set forth herein.

FIG. 3A is a front elevational view of a front suspension 14 and stroke adjustment actuator 23 that is operated by the suspension actuating unit 12, in accordance with an exemplary embodiment of the present invention. FIG. 3B is an enlarged, partial front elevational view of the front suspension 14 of FIG. 3A with a stroke adjustment actuator housing 23b of the front suspension 14 in place.

As can be seen in the embodiment shown in FIG. 3A, the front suspension 14 is incorporated into a front fork of the bicycle. (It should be noted that the suspension of the present invention can alternatively or additionally be used as a rear suspension for the bicycle with an actuating unit provided for each suspension.) The front fork includes a center tube 102 that is pivotally connected to the frame of the bicycle and a bracket (or first connector) 104 that rigidly connects the center tube 102 to a first shock absorber unit 120 and a second shock absorber unit 160, which are attached at the lower ends thereof to either ends of an axle of the front wheel of the bicycle. A structural member or bracket (or second connector) 106 is provided that rigidly connects a lower portion 130 of the shock absorber unit 120 to a lower portion 170 of the shock absorber unit 160 in order to provide structural stability to the front suspension 14. The bicycle frame is attached to the center tube 102 of the upper telescoping members 122 and 162 (which are interconnected via bracket 104), and the front wheel is attached to lower portions 130 and 170 (which are interconnected via bracket 106) of the shock absorber units 120 and 160, respectively. Thus, the front suspension 14 is provided in between the bicycle frame and the front wheel to allow shock received by the front wheel to be absorbed and dampened before it reaches the frame.

The shock absorber 120 includes an upper telescoping member 122 having an upper end connected to a connecting bracket 124 of the bracket 104. The upper telescoping member 122 has a lower end that is slidably received within an upper end of the lower portion 130 of the shock absorber unit 120. Similarly, the shock absorber unit 160 includes an upper telescoping member 162 having an upper end connected to a connecting bracket 164 of the bracket 104, and the upper telescoping member 162 has a lower end that is slidably received within an upper end of the lower portion 170 of the shock absorber unit 160. The lower ends of the lower portion 130 and the lower portion 170 are attached to the axle of the front wheel of the bicycle in any known manner.

The suspension setting mechanism 23 is provided at the upper end of the upper telescoping member 122, and extends upward from the connecting bracket 124. The suspension setting mechanism 23 includes the stroke adjustment actuator 23a, as shown in FIG. 3A. The stroke adjustment actuator 23a can remain exposed as shown in FIG. 3A, or can be covered by a stroke adjustment actuator housing 23b as shown in FIG. 3B. In the embodiment shown in FIG. 3A, a fluid hose 110 extends between the first shock absorber unit 120 and the second shock absorber unit 160, as will be described in greater detail below.

Figure 4A:
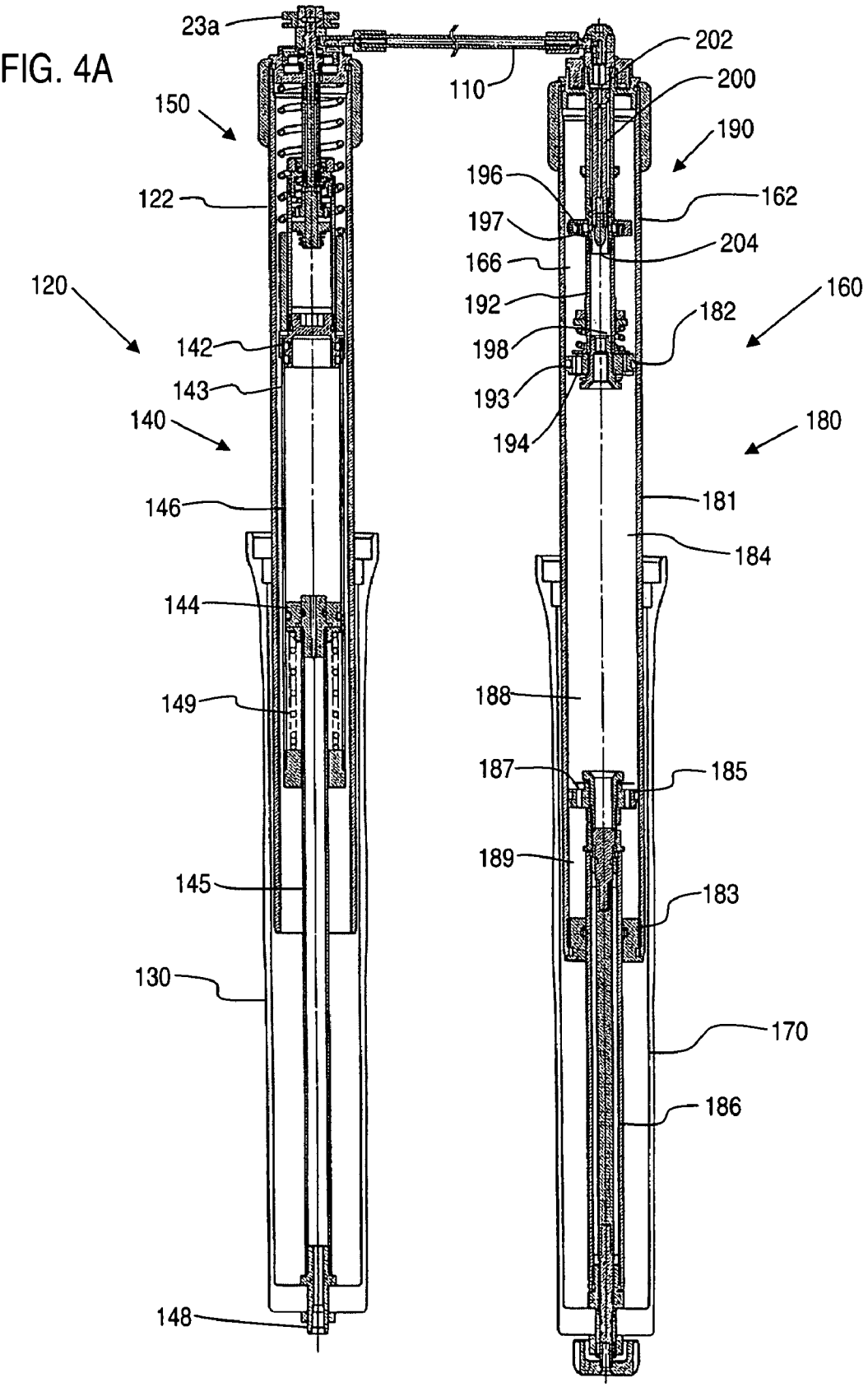
FIG. 4A is a front cross-sectional view of shock absorber units of the front suspension of FIG. 3A in a long stroke position and a stroke adjustment actuator in a first position, in accordance with an exemplary embodiment of the present invention.
Figure 4B:
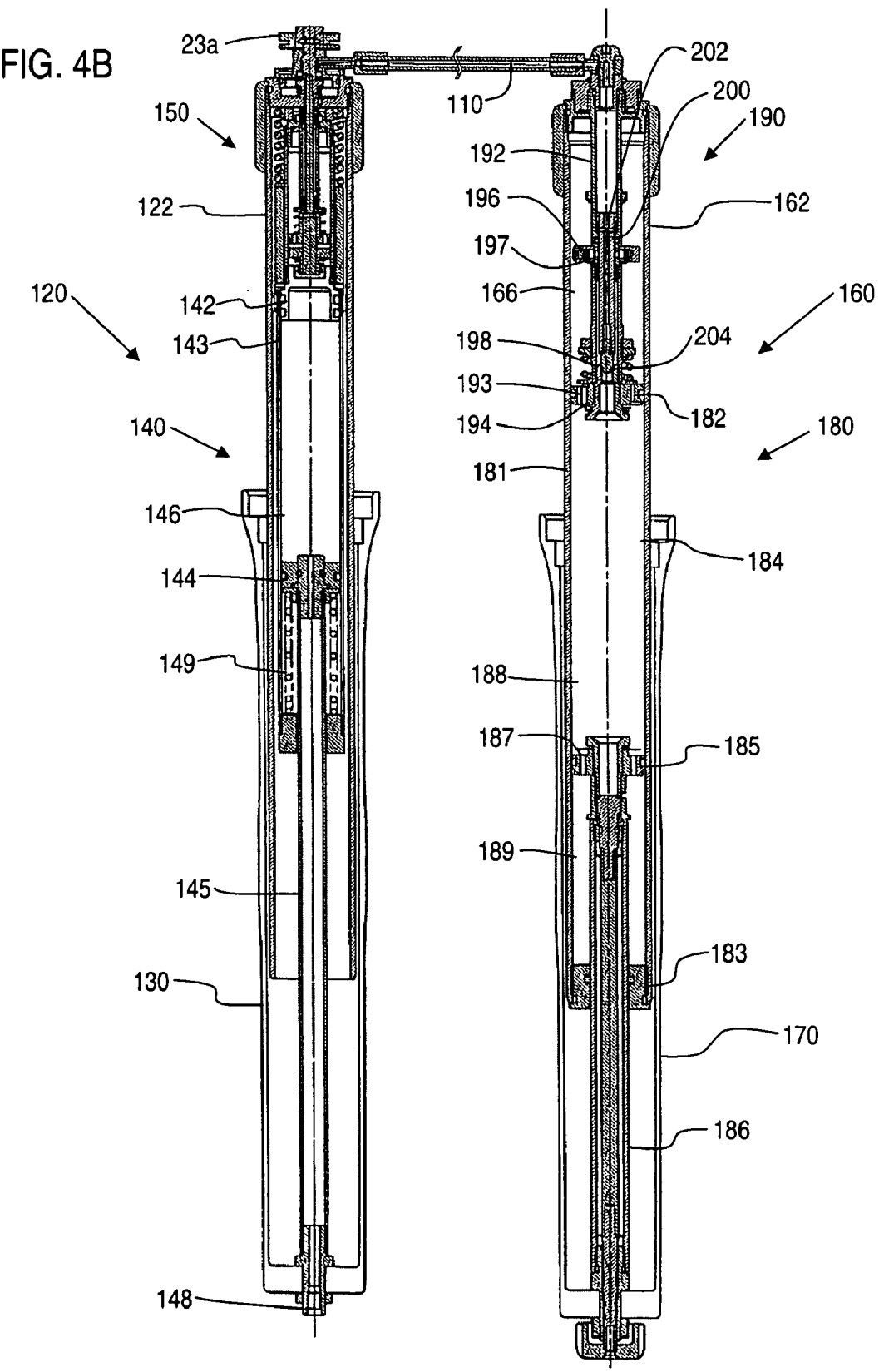
FIG. 4B is a front cross-sectional view of the shock absorber units of the front suspension of FIG. 3A in a short stroke position and the stroke adjustment actuator in the first position, in accordance with an exemplary embodiment of the present invention.

FIGS. 4A and 4B are front cross-sectional views of shock absorber units 120 and 160, respectively, of the front suspension 14. FIG. 4A depicts the shock absorber units 120 and 160 in a long stroke position, while FIG. 4B depicts the shock absorber units 120 and 160 in a short stroke position.

In both FIGS. 4A and 4B, the stroke adjustment actuator 23a is depicted in the first position, namely, the long-to-short stroke position. In the long-to-short stroke position, the shock absorber units 120 and 160 are able to move from the long stroke position (or any position at which the stroke is longer than at the short stroke position) toward the short stroke position, and are prevented from moving from the short stroke position (or any position at which the stroke is shorter than at the long stroke position) toward the long stroke position. Conversely, in the short-to-long stroke position, the shock absorber units 120 and 160 are able to move from the short stroke position (or any position at which the stroke is shorter than at the long stroke position) toward the long stroke position, and are prevented from moving from the long stroke position (or any position at which the stroke is longer than at the short stroke position) toward the short stroke position. Thus, the stroke adjustment actuator will control the adjustment of the shock absorber units to allow shortening of the stroke or lengthening of the stroke as desired by the user.

It should be noted that while the stroke adjustment actuator is used to adjust the stroke of the suspension, such an adjustment may or may not provide an adjustment of dampening characteristics or spring-rate of the shock absorber units. The various spring and dampening characteristics of the shock absorber units will continue to function regardless of the position of the stroke adjustment actuator, unless and until the second shock absorber unit 160 reaches the short stroke position and the stroke adjustment actuator is in the long-to-short stroke position, as is shown in FIG. 4B. In this embodiment, when the second shock absorber unit 160 is in the short stroke position and the stroke adjustment actuator is in the long-to-short stroke position, then a suspension lockout feature is locked to prevent or substantially prevent the contraction or expansion of the first shock absorber unit 120 and the second shock absorber unit 160 thus adjusting dampening of the suspension, until the stroke adjustment actuator is moved to the short-to-long stroke position at which time the suspension lockout feature is unlocked, as will be discussed in greater detail below.

The stroke adjustment actuator also provides a stroke adjustment locking feature. For example, when the stroke adjustment actuator is in the long-to-short stroke position and the shock absorber units reach the shortest stroke limit, then the stroke length of the first and second shock absorber units 120 and 160 are fixed until the stroke adjustment actuator is moved to the short-to-long stroke position. Similarly, when the stroke adjustment actuator is in the short-to-long stroke position and the shock absorber units reach the longest stroke limit, then the stroke length of the first and second shock absorber units 120 and 160 are fixed until the stroke adjustment actuator is moved to the long-to-short stroke position.

Thus, the stroke adjustment actuator allows a user to set it in the long-to-short stroke position to shorten the front suspension (while preventing lengthening of the stroke), for example, as the user ascends up an incline thereby reducing an angle of the bicycle frame with respect to horizontal, and then set it to the short-to-long stroke position to lengthen the stroke when the user reaches a level area. By reducing the angle of the bicycle frame with respect to horizontal, the user can achieve a more advantageous orientation of the bicycle as the user pedals up an incline. Similarly, in a configuration where the stroke adjustment actuator and shock absorber units are provided on the rear suspension of the bicycle, the user can set the stroke adjustment actuator in the long-to-short stroke position to shorten the rear suspension (while preventing lengthening of the stroke), for example, as the user descends down a hill thereby reducing an angle of the bicycle frame with respect to horizontal to provide a better orientation of the user as the user descends. Furthermore, in a configuration where a stroke adjustment actuator and corresponding shock absorber units are provided on both the front suspension and the rear suspension of the bicycle, these stroke adjustment actuators can also be used in conjunctions with one another to provide an even greater range of adjustment of the angle of the bicycle frame to horizontal.

FIGS. 4A and 4B will be used to describe the general features of the shock absorber units 120 and 160. The first shock absorber unit 120 incorporates an adjustable air spring 140, and the second shock absorber unit 160 incorporates a dampening unit 180, which in unison (via bracket 106) provide the front suspension with spring characteristics and dampening characteristics. The first shock absorber unit 120 also incorporates a stroke adjustment unit 150 on an upper end of the adjustable air spring 140 (as will be described in greater detail with respect to FIGS. 5A and 6A), and the second shock absorber unit 160 incorporates a damper adjustment unit 190 on an upper end of the dampening unit 180 (as will be described in greater detail with respect to FIGS. 5B and 6B), which in unison (via fluid hose 110 in this embodiment) provide the front suspension with an adjustable stroke length and damper adjustment.

The adjustable air spring 140 includes an upper seal member 142 that is connected to the upper telescoping member 122 via the stroke adjustment unit 150. As can be seen from a comparison of FIGS. 4A and 4B, the longitudinal position of the upper seal member along the upper telescoping member 122 can be adjusted by the stroke adjustment unit 150, and this adjustment determines the maximum total stroke length of the first shock absorber unit.

The adjustable air spring 140 further includes a lower seal member 144 that is rigidly connected to the lower end of the lower portion 130 by tube 145. The lower seal member 144 is slidably received within a tube 143 that is connected to the upper seal member 142 (therefore, the lower seal member 144 may also be called a "piston" 144), and an air chamber 146 is thus defined between the upper seal member 142 and the lower seal member 144. The air chamber 146 acts as an air spring between the upper telescoping member 122 (via upper seal member 142) and the lower portion 130 (via lower seal member 144). The amount and pressure of air within the air chamber 146 can be adjusted by the user via valve/nozzle 148, which is fluidly connected to the air chamber 146 via a passage extending through tube 145. The adjustable air spring 140 can also include a coil spring 149, which biases the lower seal member 144 toward the upper seal member 142 and provides further spring/dampening characteristics to the adjustable air spring 140.

As noted above, the stroke adjustment unit 150 can be used to adjust the maximum total stroke length of the first shock absorber unit 120 by adjusting the longitudinal position of the upper seal member 142 along the upper telescoping member 122. Since the amount of air within the air chamber 146 will remain relatively constant during use (absent adjustment using the valve/nozzle 148, of course), the relative positions between the upper seal member 142 and the lower seal member 144 will remain relatively constant when outside forces on the front suspension 14 are disregarded. Thus, the adjustment of the longitudinal position of the upper seal member 142 along the upper telescoping member 122 will have the effect of adjusting the longitudinal position of the lower seal member in the same direction, which will thereby adjust the maximum total stroke length of the first shock absorber unit 120. For example, if the upper seal member 142 is moved upward from the position in FIG. 4A to the position in FIG. 4B, then the lower seal member 144 will also move upward relative to the upper telescoping member 122 and the maximum total stroke length of the first shock absorber unit 120 will be reduced. The stroke adjustment is transmitted to the second shock absorber unit 160 via the bracket 104 and the bracket 106.

The dampening unit 180 includes an upper seal member 182 that is rigidly connected to the upper telescoping member 162. The dampening unit 180 further includes a lower seal member 185 that is rigidly connected to the lower end of the lower portion 170 by tube 186. The lower seal member 185 is slidably received within a tube 181 of the upper telescoping member 162 (therefore, the lower seal member may also be called a "piston" 185). A fluid chamber 184 is defined between the upper seal member 182 and a lower seal 183 on the lower end of the upper telescoping member 162. The fluid chamber 184 contains a fluid, such as oil, therein, that is used in conjunction with the lower seal member 185 to act as a damper. The lower seal member 185 has plural holes 187 that extend therethrough and allow fluid in the fluid chamber 184 to travel therethrough. Thus, the lower seal member 185 divides the fluid chamber 184 into an upper cavity 188 and a lower cavity 189, with the holes 187 of the lower seal member allowing fluid to travel from one cavity to the other depending on forces acting on the upper telescoping member 162 and the lower portion 170. Due to the small volume of fluid that can travel through the holes 187, the movement of the lower seal member 185 along the tube 181 and within the fluid chamber 184 provides a dampening effect to forces acting on the upper telescoping member 162 and the lower portion 170.

Due to the movement of the tube 186 into and out of the fluid chamber 184 as the air spring 140 (and thus correspondingly the dampening unit) contracts and expands, the pressure within the fluid chamber 184 will tend to increase and decrease, respectively, and the overall pressure within the second shock absorber 160 unit will increase and decrease, respectively. Also, during stroke adjustment, the stroke adjustment unit 150 will inject fluid into the fluid chamber 184 during shortening of the stroke via the fluid hose 110 and the damper adjustment unit 190, and extract fluid from the fluid chamber 184 during lengthening of the stroke, thereby also tending to increase and decrease, respectively, pressure within the fluid chamber 184. In order to equalize pressure differentials within the second shock absorber unit 160, the damper adjustment unit 190 includes several components that allow fluid from the fluid chamber 184 to flow into and out of a reservoir chamber 166 that is provided above the upper seal member 182. For example, a tube 192 is provided that extends downward through an opening in the upper seal member 182, one or more holes 193 are provided in the upper seal member 182, one or more one-way valves (e.g., back-flow flap that is preferably spring-biased) 194 for the holes 193 are provided on the lower surface of the upper seal member 182, one or more openings 196 are provided at a mid-point of the tube 192, and one or more one-way valves (e.g., back-flow flap that can be spring-biased) 197 for the openings 196 are provided to allow flow into but not out of the reservoir chamber 166.

The damper adjustment unit 190 includes a valve 200 that is slidably received within the interior of the tube 192. The valve 200 can slide between an upper position as shown in FIG. 4A when the second shock absorber 160 is in the long stroke position, to a lower position as shown in FIG. 4B when the second shock absorber 160 is in the short stroke position. The movement of the valve 200 is caused by fluid being injected into the damper adjustment unit 190 by the stroke adjustment unit 150 via the fluid hose 110 and forcing against an upper surface 202 of the valve 200, and fluid being extracted from the damper adjustment unit 190 by the stroke adjustment unit 150 via the fluid hose 110. When the valve 200 is moved to the lower position, then a lower end 204 of the valve 200 seats against and seals with a seat 198 on a lower end of the tube 192.

When the valve 200 is at any position along the tube 192 except at the lower position, and pressure within the fluid chamber 184 increases due to upward movement of the tube 186 or downward movement of the valve 200, then fluid from the fluid chamber 184 can flow up the tube 192 (around the outer surface of the valve 200 if necessary) and through the opening(s) 196 and one way valve(s) 197 into the reservoir chamber 166, which is otherwise empty of fluid or partially filled with fluid. Conversely, when the valve 200 is at any position along the tube 192 except at the lower position, and pressure within the fluid chamber 184 decreases due to downward movement of the tube 186 or upward movement of the valve 200, then fluid from the reservoir chamber 166 can flow down through the hole(s) 193 and one-way valve(s) 194 into the fluid chamber 184. When the valve 200 is at the lower position as shown in FIG. 4B, then the contact between the lower end 204 of the valve 200 and seat 198 will prevent fluid from being sent from the fluid chamber 184 into the reservoir chamber 166 (note also that the one-way valve(s) 194 prevents fluid from flowing through the hole(s) 193 into the reservoir chamber 166), which will act as a suspension lockout feature and prevent or substantially prevent the contraction or expansion of the first shock absorber unit 120 and the second shock absorber unit 160, since the tube 186 will be restricted from sliding and thus unit 160 from expanding or contracting due to the inability to equalize pressure within the unit 160, which will prevent or substantially prevent expansion or contraction of unit 120 via bracket 106. The suspension lockout feature can be unlocked to allow expansion and contraction of the first and second shock absorber units 120 and 160 by moving the stroke adjustment actuator 23a from the first position, as shown in FIGS. 4A and 4B, to the second position, and by lengthening the stroke such that the lower end 204 of the valve 200 and seat 198 are no longer in contact.

In addition to the suspension lockout feature discussed above, the damper adjustment unit 190 is also configured to adjust the damping force applied by the damper 180 within the second shock absorber unit 160. As the valve 200 moves downward from the uppermost position shown in FIG. 4A to the lowermost position in FIG. 4B (i.e., from the long stroke position to the short stroke position), the damper adjustment unit 190 will continuously increase the damping force of the dampening unit 180 as the stroke is reduced by the stroke adjustment unit. The converse is also true as the valve 200 moves upward. The movement of the valve 200 from the uppermost position shown in FIG. 4A to the lowermost position in FIG. 4B will continuously increase the overall pressure within the second shock absorber 160, or more specifically within the upper telescoping member 162, which will continuously increase the dampening force applied by the dampening unit 180. Also, the upward movement of the tube 186 into the upper telescoping member 162 during shortening of the stroke length will also continuously increase the overall pressure within the upper telescoping member 162. Additionally, as the valve 200 moves downward during shortening of the stroke length, the valve 200 will act as a barrier to fluid travelling upward through tube 192 in an attempt to equalize pressure between the fluid chamber 184 and the reservoir chamber 166, which will also effect the pressure within the fluid chamber 184, which will also have an effect on the dampening force applied by the dampening unit 180.

FIGS. 5A, 5B, 6A, and 6B provide enlarged, partial cross-sectional views of the shock absorber units 120 and 160 of the front suspension 14, and will be used to provide further explanation of the components thereof, according to an exemplary embodiment. FIGS. 5A and 5B depict the shock absorber units 120 and 160, respectively, in the long stroke position and the stroke adjustment actuator in the first position (i.e., long-to-short stroke position), and FIGS. 6A and 6B depict the shock absorber units 120 and 160, respectively, in the short stroke position and the stroke adjustment actuator in the second position (i.e., short-to-long stroke position).

Referring to FIG. 5A, the stroke adjustment actuator 23a is rigidly connected to a shaft 152 that extends downwardly therefrom. The shaft 152 is rotatably mounted within a bearing member 220; however, the shaft 152 is generally prevented from moving axially (i.e., upward or downward, as depicted). The shaft includes a middle portion 153 and a lower portion 154, which has a recessed portion 156 on an outer surface thereof.

A flow control structure 222 is connected to a lower end of the bearing member 220, and the shaft 152 is rotatably provided within the flow control structure 222. The flow control structure 222 has a first flow control portion 230 and a second flow control portion 240 incorporated into a lower end thereof. The flow control structure 222 includes openings 224 above the first flow control portion 230, openings 225 (see FIG. 6A which shows the control structure 222 in a ninety degree axial offset as compared to the depiction in FIG. 5A) below the openings 225 and above the first flow control portion 230, openings 236 in between the first flow control portion 230 and the second flow control portion 240, and openings 226 below the second flow control portion 240. The first flow control portion 230 has openings 232 extending from an upper surface thereof to a lower surface thereof, and a one-way valve 234 on the upper surface thereof, which is preferably spring biased downward and prevents downward flow through the first flow control portion 230. The second flow control portion 240 has openings 242 (see FIG. 6A, since openings 232 and 242 are offset from one another about the axis of the control structure 222, and FIG. 6A shows the control structure 222 in a ninety degree axial offset as compared to the depiction in FIG. 5A) extending from an upper surface thereof to a lower surface thereof, and a one-way valve 244 on the lower surface thereof, which is preferably spring biased upward and prevents upward flow through the second flow control portion 240. The shaft 152 and the flow control structure 222 generally do not slide axially with respect to one another.

The first and second flow control portions 230 and 240 are slidably provided within a cylinder 251 of a sealed chamber 250. An upper end of the cylinder 251 is sealed by an upper seal 252 and a lower end of the cylinder 251 is sealed by the upper seal member 142 to form the sealed chamber 250. The chamber 250 is filled with fluid, which can be the same as or different from the fluid which is provided in the dampening unit 180 of the second shock absorber unit 160. In this embodiment, since the flow control structure 222 is generally not moveable in the axial direction thereof, the chamber 250 is axially slidable over the first and second flow control portions 230 and 240, but this axial sliding is controlled by the relative axial angular positions of the first and second flow control portions 230 and 240 with respect to the shaft 152. The relative axial angular positions between the first and second flow control portions 230 and 240 and the shaft 152 being determined by the angular rotation of the shaft 152 about its axis via the rotation of the stroke adjustment actuator 23a. The axial sliding of the chamber 250 is determined by fluid being pooled either in a cavity within the chamber 250 defined by the upper surface of the first flow control portion 230 and the upper seal 252, or in a cavity within the chamber 250 defined by the lower surface of the second flow control portion 240 and the upper seal member 142. The pressure differentials caused by the pooling fluid causes the chamber 250 to move downward or upward, which causes fluid to be injected into or extracted from the second shock absorber unit 160 (note that the fluid volume in the chamber 250 in FIG. 4A is greater than the fluid volume in the chamber 250 in FIG. 4B due to the presence of a tubular structure extending within the chamber 250 in FIG. 4B). The chamber 250 is biased downward toward the long stroke position by a compression spring (or pressing member or biasing member) 260.

Thus, when the stroke adjustment actuator 23a is in the long-to-short stroke position as shown in FIG. 5A and an outside force (e.g., the weight of the user on the bicycle frame) acts to compress or shorten the length of the first shock absorber unit 120, then the fluid present within chamber 250 will flow through the stroke adjustment unit 150 as shown by the arrows in FIG. 5A, through the fluid hose 110, and into the damper adjustment unit 190 as shown by the arrows in FIG. 5B. When the stroke adjustment actuator 23a is in the long-to-short stroke position, the recessed portion 156 will axially angularly align with openings 226 (which is not the case when the stroke adjustment actuator 23a is in the short-to-long stroke position as in FIG. 6A) to allow the fluid in the chamber 250 to flow into the recessed portion 156, upward along the recessed portion 156 to the openings 236 (thus bypassing the one-way valves 244), through openings 232 and one-way valve 234, through opening 224, then upward through a gap between the outer surface of the middle portion 153 of the shaft 152 and the inner surface of the upper tubular portion of the flow control structure 222, and then upward through gaps between the upper portion of the shaft 152 and the bearing member 220 until the fluid reaches the fluid hose 110. The fluid travels along the fluid hose 110 to an upper cavity 206 in the damper adjustment unit 160, and pools in the cavity 206 and creates an increased pressure differential acting on the upper surface 202 of the valve 200 thus forcing the valve 200 downward and increasing the size of the cavity.

In this manner, the stroke of the first shock absorber unit 120 will shorten due to the upward movement of the chamber 250, and in unison the stroke length of the second shock absorber unit 160 will shorten due to the connection to the first shock absorber unit 120 via bracket 104 and bracket 106. As noted previously, since the amount of air within the air chamber 146 will remain relatively constant during use (absent adjustment using the valve/nozzle 148, of course), the relative positions between the upper seal member 142 and the lower seal member 144 will remain relatively constant when outside forces on the front suspension 14 are disregarded. Thus, the upward adjustment of the longitudinal position of the upper seal member 142 along the upper telescoping member 122 will have the effect of upwardly adjusting the longitudinal position of the lower seal member 144, which will shorten the maximum total stroke length of the first and second shock absorber units 120 and 160.

Note that when the stroke adjustment actuator 23a is in the long-to-short stroke position, a force that is acting to expand or increase the length of the first shock absorber unit 120 will not be able to increase the stroke, since the one-way valve 234 will prevent the fluid from traveling downward through the openings 232.

When the stroke adjustment actuator 23a is rotated (e.g., by ninety degrees in the present embodiment, or some other alternative predetermined amount in an alternative embodiment) to the short-to-long stroke position as shown in FIG. 6A (note that for ease in illustration of the fluid flow, FIG. 6A shows the shaft 152 in the same axial angular position as in FIG. 5A, and instead shows the flow control structure 222 in an axially rotated orientation) and the outside force is removed or reversed to elongate the unit 120, then the reversed force and/or the spring 260 acts to expand or increase the length of the first shock absorber unit 120, and then the fluid within the stroke adjustment unit 150 and the damper adjustment unit 190 will flow in the manner depicted by the arrows in FIGS. 6A and 6B. Thus, fluid present within cavity 206 will flow out of the damper adjustment unit 190, through the fluid hose 110 and into the stroke adjustment unit 150. In the stroke adjustment unit 150, the fluid will flow downward through gaps between the upper portion of the shaft 152 and the bearing member 220, downward through the gap between the outer surface of the middle portion 153 of the shaft 152 and the inner surface of the upper tubular portion of the flow control structure 222, through openings 224, through openings 225 (which is aligned with the recessed portion 156 when the stroke adjustment actuator 23a is in the short-to-long stroke position), downward along the recessed portion 156 and into openings 236 (thus bypassing the one-way valve 234), downward through openings 242 and one-way valves 244, and into the cavity in the chamber 250 below the second flow control portion 240. The fluid pools in the cavity in the chamber 250 below the second flow control portion 240 and allows the chamber 250 to move downward.

In this manner, the stroke of the first shock absorber unit 120 will lengthen due to the downward movement of the chamber 250, and in unison the stroke length of the second shock absorber unit 160 will lengthen due to the connection to the first shock absorber unit 120 via bracket 104 and bracket 106. As noted previously, since the amount of air within the air chamber 146 will remain relatively constant during use (absent adjustment using the valve/nozzle 148, of course), the relative positions between the upper seal member 142 and the lower seal member 144 will remain relatively constant when outside forces on the front suspension 14 are disregarded. Thus, the downward adjustment of the longitudinal position of the upper seal member 142 along the upper telescoping member 122 will have the effect of downwardly adjusting the longitudinal position of the lower seal member 144, which will lengthen the maximum total stroke length of the first and second shock absorber units 120 and 160.

Note that when the stroke adjustment actuator 23a is in the short-to-long stroke position, a force that is acting to compress or shorten the length of the first shock absorber unit 120 will not be able to decrease the stroke, since the one-way valve 244 will prevent the fluid from traveling upward through the openings 242.

Figure 7:
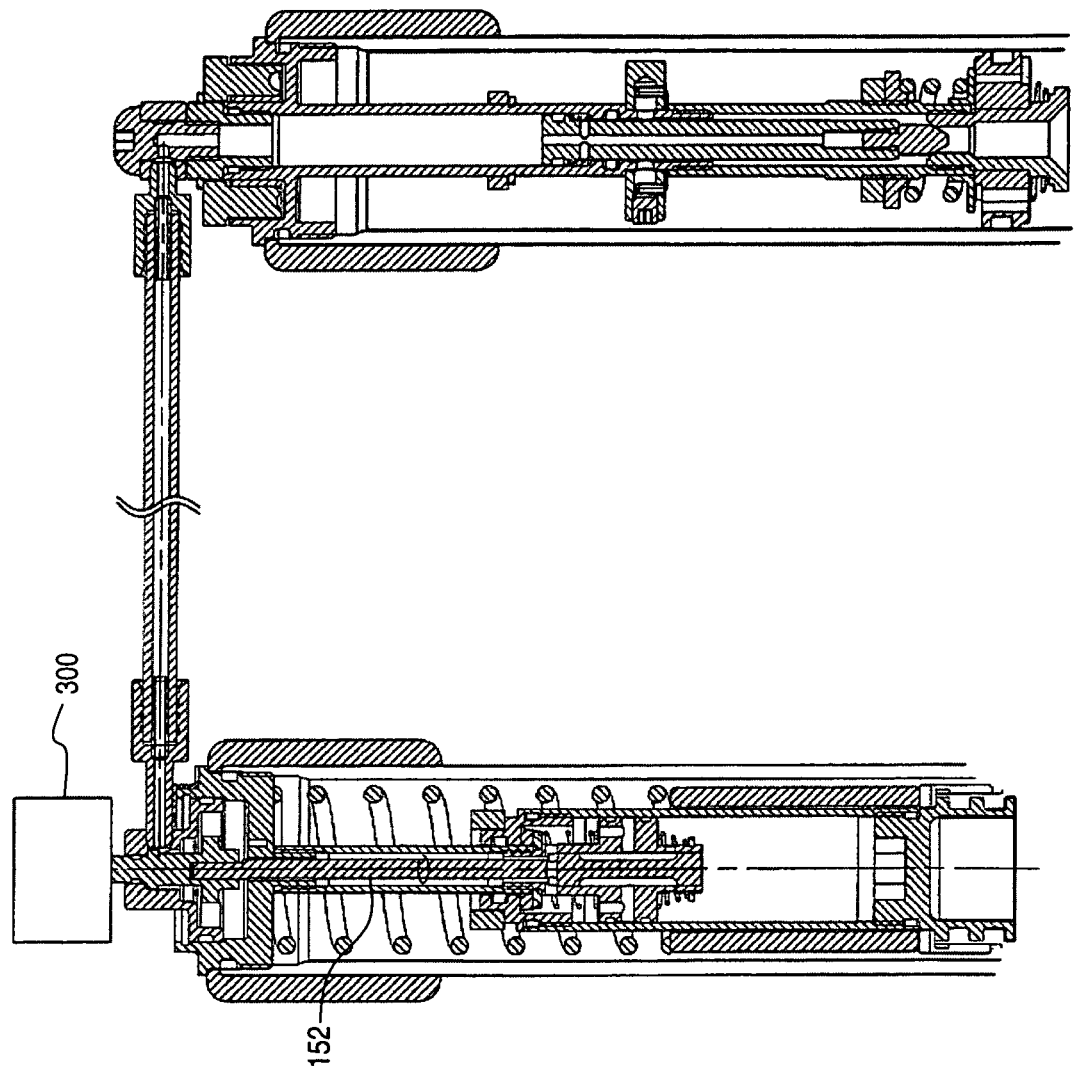
FIG. 7 is an enlarged, partial front cross-sectional view of shock absorber units of a front suspension in a short stroke position and a stroke adjustment actuator in a first position, in accordance with an additional exemplary embodiment of the present invention.

FIG. 7 is an enlarged, partial front cross-sectional view of shock absorber units of a front suspension in a short stroke position and a stroke adjustment actuator in a first position, in accordance with an additional exemplary embodiment of the present invention. In the embodiment of FIG. 7, a motor driven actuator 300 is used as the stroke adjustment actuator to rotate between the long-to-short stroke position and the short-to-long stroke position. Thus, a motor is used to drive the motor driven actuator 300, and thereby rotate the shaft 152. A suspension actuating unit can be provided on the handlebars of the bicycle so that the user can select between the long-to-short stroke position and the short-to-long stroke position, and the suspension actuating unit can electronically control the motor and motor driven actuator in accordance with the user's input. The shock absorber units of this embodiment will otherwise operate in the same manner as discussed above with respect to FIGS. 3A, 4A, 4B, 5A, 5B, 6A, and 6B.

Figure 8A:
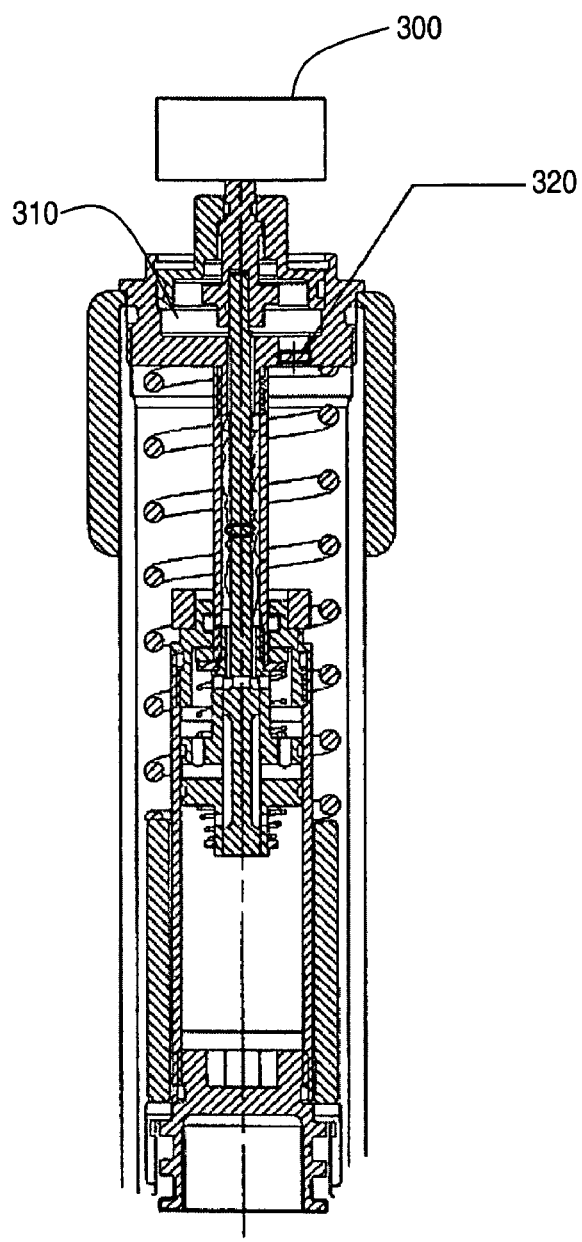
FIGS. 8A and 8B are enlarged, partial front cross-sectional views of shock absorber units of a front suspension in a short stroke position and a stroke adjustment actuator in a first position, in accordance with a further exemplary embodiment of the present invention.
Figure 8B:
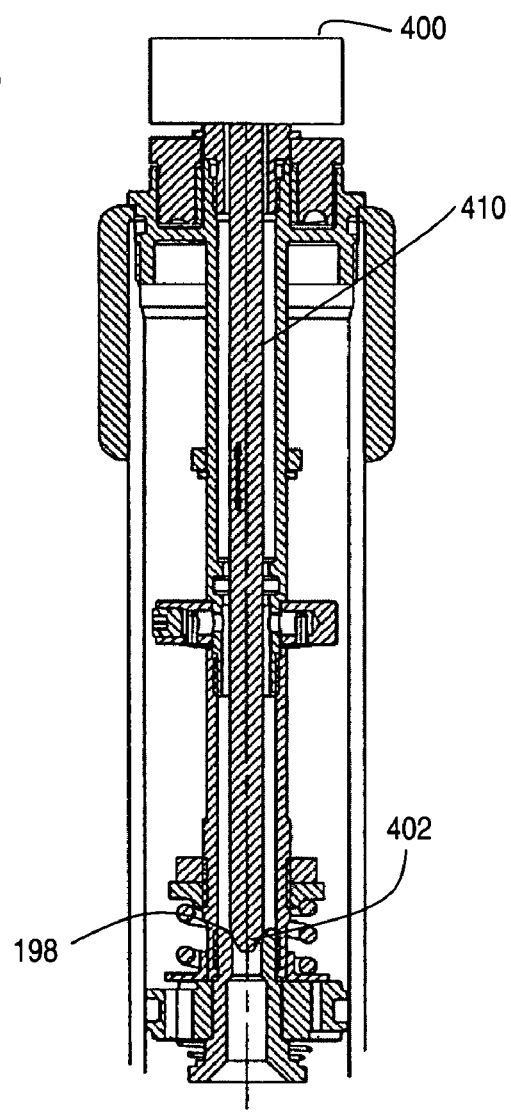

FIGS. 8A and 8B are enlarged, partial front cross-sectional views of shock absorber units of a front suspension in a short stroke position and a stroke adjustment actuator in a first position, in accordance with a further exemplary embodiment of the present invention. In the embodiment of FIGS. 8A and 8B, a motor driven actuator 300 is used as the stroke adjustment actuator to rotate between the long-to-short stroke position and the short-to-long stroke position. However, in this embodiment, fluid from the stroke adjustment unit is not sent to the second shock absorber unit, and thus no fluid hose is provided therebetween, but rather is pooled in a cavity 310, and the pressure within the cavity 310 is monitored by a sensor 320 to monitor overpressurization within the cavity 310.

Since fluid is not sent to the second shock absorber unit in this embodiment, a damper actuator 400 is used to drive and control the axial motion of a shaft 410, which is used in place of the valve 200 of FIGS. 4A-6B, to perform the suspension lockout feature and the dampening adjustment feature. The damper actuator 400 can therefore axially drive shaft 410 downward until a lower end 402 of the damper actuator 400 contacts and seals with the seat 198, and thereby prevents or substantially prevents the contraction or expansion of the first and second shock absorber units thereby adjusting dampening forces. The damper actuator 400 can be controlled to perform the lockout and dampening adjustment features using a suspension actuating unit that is also used to control the motor driven actuator, and can be controlled to perform the lockout and dampening adjustment features either in unison with the stroke adjustment (as in the previous exemplary embodiments) or can be controlled to perform the lockout and/or dampening adjustment features separate from the stroke adjustment. A control processor within the suspension actuating unit can therefore be used to control the stroke length of the suspension, the suspension lockout feature, and the suspension dampening adjustment feature in response to inputs from the user.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein. The term "comprising" and its derivatives, as used herein, are intended to be open ended terms that specify the presence of the stated features, elements, components, groups, integers, and/or steps, but do not exclude the presence of other, unstated features, elements, components, groups, integers, and/or steps. This definition also applies to words of similar meaning, for example, the terms "having" and "including" and their derivatives.

What is claimed is:

1. A bicycle suspension comprising:
   a stroke adjustment unit configured to adjust a stroke of the bicycle suspension, which is configured to expand and contract within the stroke;
   a suspension damper configured to apply damping force to the bicycle suspension;
   a damper adjustment unit configured to adjust the damping force applied by the suspension damper in accordance with the stroke adjusted by the stroke adjustment unit;
   a first telescopic tube including the stroke adjustment unit and a biasing member configured to expand the first telescopic tube;
   a second telescopic tube including the suspension damper and the damper adjustment unit; and
   a connector connecting the first telescopic tube and the second telescopic tube so that the second telescopic tube expands and contracts as the first telescopic tube expands and contracts, respectively,
   wherein a fluid hose is provided that fluidly connects a first fluid chamber in the damper adjustment unit with a second fluid chamber in the stroke adjustment unit to exchange fluid therebetween during actuation of the damper adjustment unit and the stroke adjustment unit.

2. The bicycle suspension according to claim 1, wherein the damper adjustment unit is configured to lock expansion and contraction of the bicycle suspension.

3. The bicycle suspension according to claim 1, wherein the damper adjustment unit is configured to adjust the damping force by increasing the damping force as the stroke is reduced by the stroke adjustment unit.

4. The bicycle suspension according to claim 1, wherein the stroke adjustment unit further comprises a sealed chamber provided within the first telescopic tube, wherein a location of the sealed chamber along the first telescopic tube determines the stroke, and wherein the biasing member is configured to bias the sealed chamber from a short stroke position toward a long stroke position.

5. The bicycle suspension according to claim 4, wherein the stroke adjustment unit further comprises:
   a flow control structure extending within the sealed chamber; and
   a stroke adjustment actuator being configured to move relative to the flow control structure, the stroke adjustment actuator being configured to move between a first position and a second position,
   wherein, when the stroke adjustment actuator is in the first position, then the flow control structure permits fluid within the sealed chamber to flow to a first portion of the sealed chamber, which forces the sealed chamber toward the long stroke position, and
   wherein, when the stroke adjustment actuator is in the second position, then the flow control structure permits fluid within the sealed chamber to flow to a second portion of the sealed chamber, which forces the sealed chamber to the short stroke position.

6. The bicycle suspension according to claim 5, wherein:
   when the stroke adjustment actuator is in the first position, then the flow control structure prevents fluid within the sealed chamber from flowing to the second portion of the sealed chamber; and
   when the stroke adjustment actuator is in the second position, then the flow control structure prevents fluid within the sealed chamber from flowing to the first portion of the sealed chamber.

7. The bicycle suspension according to claim 5, wherein the flow of fluid within the sealed chamber is used to actuate the damper adjustment unit.

8. The bicycle suspension according to claim 1, wherein the stroke adjustment unit further comprises a stroke adjustment actuator having a first position and a second position, wherein the first position is configured to allow the stroke to be shortened, and wherein the second position is configured to allow the stroke to be lengthened.

9. The bicycle suspension according to claim 8, wherein the first position is configured to prevent the stroke from being lengthened, and wherein the second position is configured to prevent the stroke from being shortened.

10. The bicycle suspension according to claim 8, wherein the stroke adjustment actuator is a motor driven actuator.

11. A bicycle suspension comprising:
    means for adjusting a stroke of the bicycle suspension, which is configured to expand and contract within the stroke;
    means for applying a damping force to the bicycle suspension;
    means for adjusting the damping force in accordance with the stroke adjusted by the means for adjusting the stroke;
    a first telescopic tube including the means for adjusting the stroke and a biasing member configured to expand the first telescopic tube;
    a second telescopic tube including the means for applying a damping force and the means for adjusting the damping force; and
    a connector connecting the first telescopic tube and the second telescopic tube so that the second telescopic tube expands and contracts as the first telescopic tube expands and contracts, respectively,
    wherein a fluid hose is provided that fluidly connects a first fluid chamber in the means for adjusting the damping force with a second fluid chamber in the means for adjusting the stroke to exchange fluid therebetween during actuation of the means for adjusting the damping force and the means for adjusting the stroke.

12. The bicycle suspension according to claim 11, wherein the means for adjusting the dampening force includes means for locking expansion and contraction of the bicycle suspension.

13. The bicycle suspension according to claim 11, wherein the means for adjusting the dampening force is configured to adjust the damping force to increase the damping force as the stroke is reduced by the means for adjusting the stroke.

14. The bicycle suspension according to claim 11, wherein the means for adjusting the stroke has a first state in which the stroke is allowed to be shortened, and wherein the means for adjusting the stroke has a second state in which the stroke is allowed to be lengthened.

15. The bicycle suspension according to claim 14, wherein the means for adjusting the stroke is configured to prevent the stroke from being lengthened in the first state, and wherein the means for adjusting the stroke is configured to prevent the stroke from being shortened in the second state.

16. A method of adjusting a bicycle suspension having a suspension damper configured to apply damping force to the bicycle suspension, said method comprising:
    adjusting a stroke of the bicycle suspension, which is configured to expand and contract within the stroke; and adjusting the damping force in accordance with the adjusting of the stroke, wherein a first telescopic tube is provided that includes a stroke adjustment unit for adjusting the stroke and a biasing member configured to expand the first telescopic tube, wherein a second telescopic tube is provided that includes the suspension damper and a damper adjustment unit for adjusting the damping force, wherein a connector is provided that connects the first telescopic tube and the second telescopic tube so that the second telescopic tube expands and contracts as the first telescopic tube expands and contracts, respectively, and wherein a fluid hose is provided that fluidly connects a first fluid chamber in the damper adjustment unit with a second fluid chamber in the stroke adjustment unit to exchange fluid therebetween during actuation of the damper adjustment unit and the stroke adjustment unit.

17. The method according to claim 16, wherein the adjusting of the dampening force includes increasing the damping force as the stroke is shortened.

18. The method according to claim 16, wherein the adjusting of the dampening force includes locking expansion and contraction of the bicycle suspension.

19. The method according to claim 16, wherein the adjusting of the stroke includes providing a stroke adjustment actuator having a first position and a second position, wherein the first position allows the stroke to be shortened, and wherein the second position allows the stroke to be lengthened.

20. The method according to claim 19, wherein the first position prevents the stroke from being lengthened, and wherein the second position prevents the stroke from being shortened.

21. The bicycle suspension according to claim 1, wherein the adjustment of the stroke by the stroke adjustment unit is between a first total stroke length and a second total stroke length, and wherein the first total stroke length and the second total stroke length are different, non-zero lengths.

22. The bicycle suspension according to claim 11, wherein the adjustment of the stroke by the means for adjusting a stroke is between a first total stroke length and a second total stroke length, and wherein the first total stroke length and the second total stroke length are different, non-zero lengths.

23. The method according to claim 16, wherein the adjustment of the stroke by the stroke adjustment unit is between a first total stroke length and a second total stroke length, and wherein the first total stroke length and the second total stroke length are different, non-zero lengths.

* * * * *